United States Patent [19]

Gamble et al.

[11] Patent Number: 5,787,368

[45] Date of Patent: Jul. 28, 1998

[54] SPACECRAFT YAW CONTROL USING ONLY WHEEL SPEED MEASUREMENTS PROCESSED THROUGH A SIMPLE FILTER BANK

[75] Inventors: Donald W. Gamble; Xenophon H. Price, both of Menlo Park; Kam Kin Chan, San Jose, all of Calif.

[73] Assignee: Space Systems/Loral, Inc., Palo Alto, Calif.

[21] Appl. No.: 552,613

[22] Filed: Nov. 3, 1995

[51] Int. Cl.$^6$ ............................................. B64G 1/24
[52] U.S. Cl. .......................... 701/13; 701/226; 244/164; 244/166
[58] Field of Search ........................ 364/424.03, 459; 244/158 R, 164, 165, 166, 171, 176; 701/13, 226

[56] References Cited

U.S. PATENT DOCUMENTS

| | | | |
|---|---|---|---|
| 3,350,033 | 10/1967 | Goldberg | 244/1 |
| 3,591,108 | 7/1971 | Perkel | 244/1 |
| 3,866,025 | 2/1975 | Cavanagh | 235/150.2 |
| 3,998,409 | 12/1976 | Pistiner | 244/165 |
| 3,999,729 | 12/1976 | Muhlfelder et al. | 244/165 |
| 4,010,921 | 3/1977 | Pistiner et al. | 244/166 |
| 4,032,759 | 6/1977 | Danik | 73/178 R |
| 4,046,341 | 9/1977 | Quinlivan | 244/181 |
| 4,062,509 | 12/1977 | Muhlfelder et al. | 244/166 |
| 4,071,211 | 1/1978 | Muhlfelder et al. | 244/165 |
| 4,106,094 | 8/1978 | Land | 364/453 |
| 4,188,666 | 2/1980 | Legrand et al. | 244/164 |
| 4,294,420 | 10/1981 | Broquet | 244/165 |
| 4,521,855 | 6/1985 | Lehner et al. | 364/434 |
| 4,931,942 | 6/1990 | Garg et al. | 364/459 |
| 5,248,118 | 9/1993 | Cohen et al. | 244/164 |
| 5,269,483 | 12/1993 | Flament | 244/164 |
| 5,279,483 | 1/1994 | Blancke et al. | 244/165 |

FOREIGN PATENT DOCUMENTS 0 453 096 A1  10/1991  European Pat. Off. .

OTHER PUBLICATIONS

Lebsock, K.L., "Magnetic Desaturation of a Momentum Bias System", vol. 6, No. 6, Nov.–Dec. 1983.

Primary Examiner—Gary Chin
Attorney, Agent, or Firm—Perman & Green, LLP

[57] ABSTRACT

An attitude or orientation control system for spacecraft that provides for yaw axis error reduction and momentum dumping using a simple calculation involving only the momentum wheel speeds as input and which outputs two axis (roll and yaw) torque commands. The system utilizes the spacecraft 1) momentum wheels that store spacecraft momentum, 2) processing means for the calculation of control torques, and 3) torque actuators, e.g., magnetic torquers, that can provide a torque axis anywhere in the spacecraft roll/yaw plane, and involves three fundamental steps, 1) the input of the momentum wheel speed mearsurements, and 2) the calculation of the required torques, using the wheel speed measurements, and and 3) the outputting of the required torques in a form appropriate for controlling the available actuators.

19 Claims, 3 Drawing Sheets

SPACECRAFT YAW CONTROL USING ONLY WHEEL SPEED MEASUREMENTS PROCESSED THROUGH A SIMPLE FILTER BANK

BACKGROUND OF THE INVENTION

1. Field of the Invention

The present invention relates to spacecraft attitude control systems and more particularly to a system for controlling the attitude and orientation of spacecraft such as earth satellites.

2. Prior Art

Many systems exist for automatically controlling the orientation of spacecraft to insure that a predefined travel path and desired attitude are precisely followed during flight. With the increasing use of earth satellites for research and communications the art in this regard has become quite sophisticated and complex and such practices as momentum biasing are used to achieve fine control and to reduce the magnitude of the required reorienting corrective forces. The operation of the components of these control systems generally involves complicated mathematical calculations, an example of which can be found in an article by K. L. LEBSOCK in the AIAA Journal of Guidance Controls, Vol. 6, No.6, Nov.–Dec., 1983, pps 477–483, entitled "Magnetic Desaturation Of A Momentum Bias System." An example of a control system of the well-known Luenberger observer variety, which is the type used in such orbiting satellites as the INSAT, SUPERBIRD, INTELSAT VII, and GOES-8, is disclosed in U.S. Pat. No. 4,521,855 issued in July 1985 to J. A. LEHNER and K. L. LEBSOCK. The systems used in the noted satellites have attitude error correction problems as they do not feature daily tracking of the yaw profiles so that there is no daily error information available, and the magnetic torquers used to make corrections are adversely effected by magnetic storms. Provisions to deal with these problems may involve additional complexity in the system. As the art developes it is desirable to simplify the component operations and the calculations required to achieve the desired attitude control and orientation maneuvers, as well as minimizing the monitoring functions, the errors, and the amount of processor time used for corrections. Particularly regarding momentum bias spacecraft and satellites it is desirable to provide for efficient momentum unloading, to minimize yaw pointing errors, to maximize daily repeatability of yaw pointing profiles, and to minimize the computational and memory burden on the spacecraft processor in carrying out these functions.

3. Objects:

It is accordingly an object of the present invention to provide an orientation system for spacecraft that offers better performance with a simpler design.

It is another object of the invention to provide an attitude control system for spacecraft that requires less computation and processor memory, while achieving improved yaw pointing and daily yaw repeatability.

It is a further object of the invention to provide and attitude control system for spacecraft that has greater immunity to magnetic interference from storms and uses only momentum wheel speed measurements as input.

SUMMARY OF THE INVENTION

The present invention embodies an attitude or orientation control system for spacecraft or satellites that provides for yaw axis error reduction and momentum dumping using a very simple calculation involving only the momentum wheel speed measurements as input and which outputs two axis (roll and yaw) torque commands. This control system essentially requires three elements, 1) momentum wheels for spacecraft momentum storage, 2) processing means for the calculation of control torques, and 3) torque actuators, which may be low authority actuators, e.g., magnetic torquers, that can provide a torque axis anywhere in the spacecraft roll/yaw plane. System operation involves three fundamental steps, 1) the input of measurements of the momentum wheel speeds, 2) the calculation of the required torques, using the wheel speed measurements, and 3) the outputting of the required torques in a form appropriate for controlling the available actuators.

DETAILED DESCRIPTION OF THE PREFERRED EMBODIMENT

Figure 1:
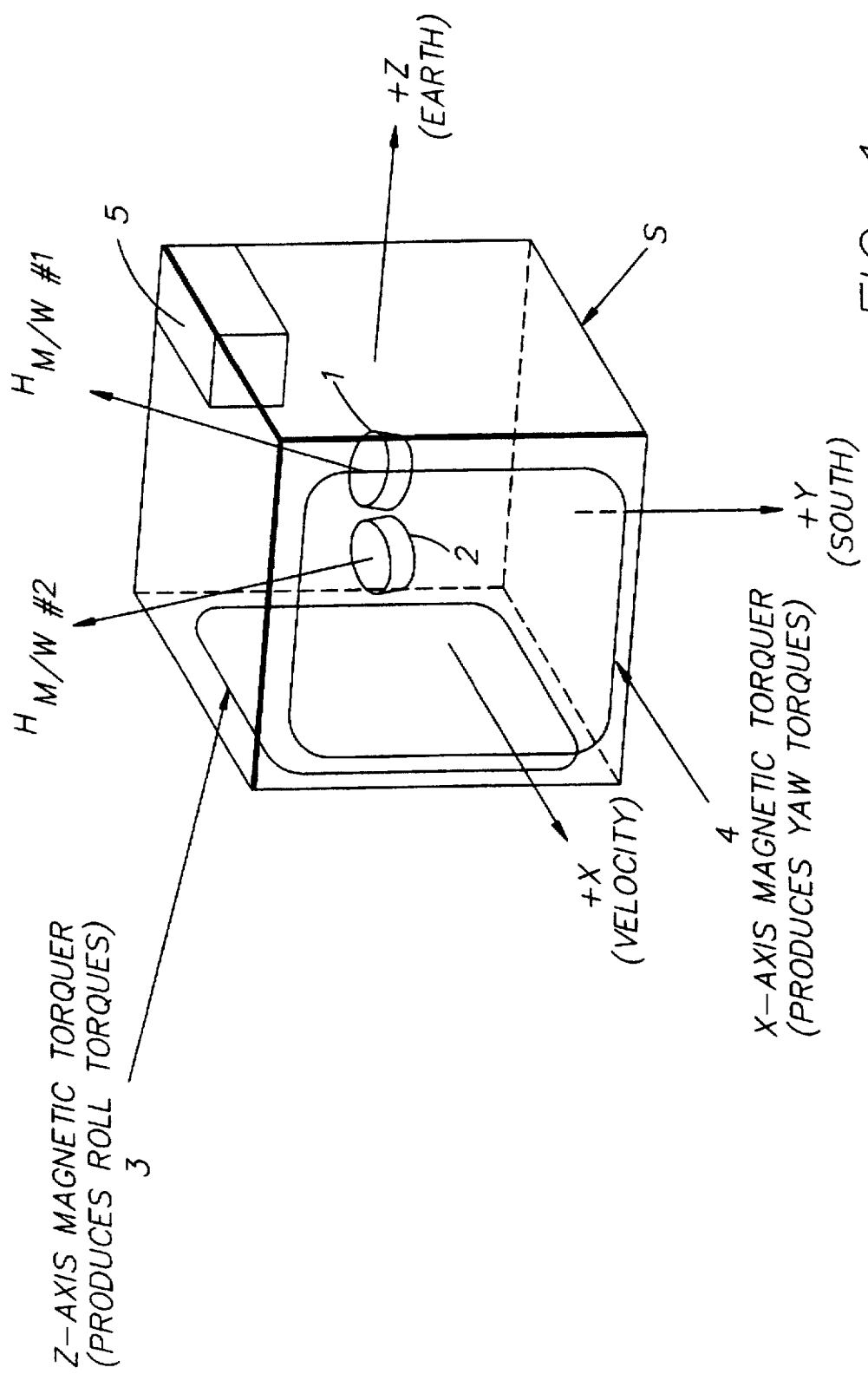
FIG. 1 is a schematic illustration of the basic components of an attitude control system in accordance with the present invention.

The present invention is directed to the attitude control systems used in spacecraft, such as earth-orbiting satellites, and involves a roll/yaw plane momentum controller employing the satellite processor in computing the necessary actuator commands to operate the satellite attitude torquers. The invention requires only the satellite momentum wheel speed measurements as input and outputs two axis (roll and yaw) torque commands to affect attitude control. A preferred embodiment, which will be referred as the HZ controller (HZC), may include a software component in its implementation, and essentially utilizes three of the components already found on such satellites, namely, momentum wheels, a control processing means, and torque actuators. As seen in FIG. 1, the spacecraft S has momentum wheels, 1 and 2, used for spacecraft momentum storage, with momentum vectors $H_{M/W\ \#1}$ and $H_{M/W\ \#2}$ that are used in combination with suitable torque actuators 3 and 4 to control the spacecraft attitude. Torque actuator or torquer 3 is a Z-axis torquer for producing roll torques and torquer 4 is an X-axis torquer for producing yaw torques. These torquer actuators may be low authority actuators, e.g., magnetic torquers, that can provide a torque axis anywhere in the spacecraft roll/yaw plane. The orthogonal axes +X, +Y, and +Z shown are respective Velocity, South, and Earth oriented axes.

The system processor 5, which, among other functions, assists in controlling spacecraft attitude, operates to perform three fundamental activities, namely, to receive the measurements of the speeds of the momentum wheels 1 and 2 as input, to calculate the required torques using the wheel speed measurements, and to output the required torques in a form appropriate for controlling the magnetic torque actuators 3 and 4. In operation, the detailed steps, in accordance with a predetermined processor timing, each cycle, multiple cycles or multiplexed or regular intervals, for controlling a spacecraft momentum axis, i.e., the Z-axis, may be as follows:

1) obtain the momentum wheel speed measurements of the spacecraft and project them onto the spacecraft Z-axis;
2) obtain the spacecraft Z-axis momentum;
3) input the Z-axis momentum into several simple filters, e.g., first or second order filters, with specified time constants, the selection of which depends on the spacecraft and the spacecraft application;

4) take the output of the filters and obtain two weighted linear sums, the weights of which will again depend on the spacecraft and the spacecraft application;

5) transform each weighted linear sum into a compatible form for spacecraft actuator command, e.g., to control magnetic torques; and 6) send the actuator commands to the actuators for carrying out the desired attitude adjustment operation.

The time constants and weights, as noted, must be selected in dependence on the particular spacecraft and spacecraft application, and are obtained through an optimization that uses an objective function constructed for the particular target spacecraft and application. For example, a preferred working embodiment comprises:

HZ=spacecraft Z-axis momentum due to the momentum wheels as determined solely from the momentum wheel tachometers;

$HZ_a$=HZ first order filtered with a long term, i.e., multiple hours, e.g., 48 hour, time constant;

$HZ_b$=HZ first order filtered with an intermediate term, i.e., tens of minutes, e.g., 24 minute, time constant;

$HZ_c$=HZ first order filtered with a short term, i.e, minutes or fractions thereof, e.g., 6 minute, time constant;

X-axis magnetic torquer coil amps, which correspond to the value produced by one of the two weighted linear sums,=$g_1 \times HZ_a + g_2 \times HZ_b + g_3 \times HZ_c$;

where $g_1+g_2+g_3=1$; and

Z-axis magnetic torquer coil amps, which correspond to the value produced by the other of the two weighted linear sums,=$g_4 \times HZ_a + g_5 \times HZ_b + g_6 \times HZ_c$;

where $g_4+g_5+g_6=1$.

A particular implementation, in processor hardware or software or both, of the roll/yaw plane momentum controller (HZC) in an algorithm given as a FORTRAN like code fragment is as follows. This code or its equivalent is to be executed at 64 second intervals:

$HZ_a$=0.997925*$HZ_a$+0.002075*HZ!513.520 minute time constant;

$HZ_a$=0.997925*$HZ_a$+0.002075*HZ!513.520 minute time constant, $HZ_b$=0.962838*$HZ_b$+0.037162*HZ!28.166 minute time constant, $HZ_c$=0.854345*$HZ_c$+0.145655*HZ!6.776 minute time constant, Xamp=8.52*$HZ_a$−7.97*$HZ_b$−0.55*$HZ_c$ Zamp=−2.82*$HZ_a$−8.48*$HZ_b$−11.30*$HZ_c$ where all of the variables are single precision, and HZ=the spacecraft body Z-axis component of the momentum due to the momentum wheels in newton-meterseconds, +z points toward the Earth;

Xamp=the commanded current in amps, prior to being limited, to the East face magnetic torquer, which produces Z-axis torques;

Zamp=the commanded current in amps, prior to being limited, to the anti-earth face magnetic torquer, which produces X-axis torques;

The recommended limits for this controller are a maximum of 0.4 amp and a minimum of −0.4 amp for both axes.

Figure 2A:
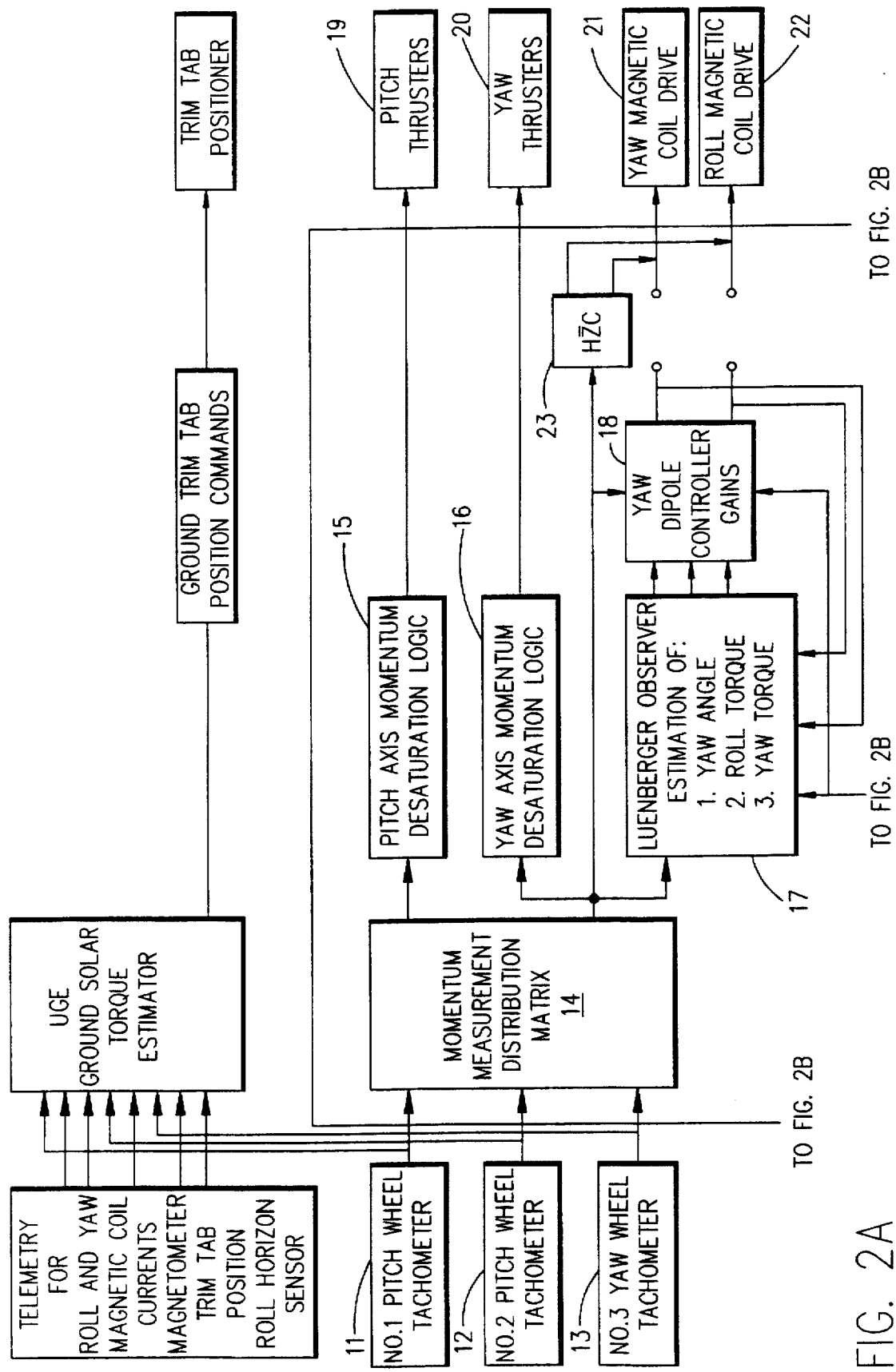
FIG. 2 is a block diagram illustrating the incorporation of an attitude controller in accordance with the invention in a prior art system including a Luenberger observer.
Figure 2B:
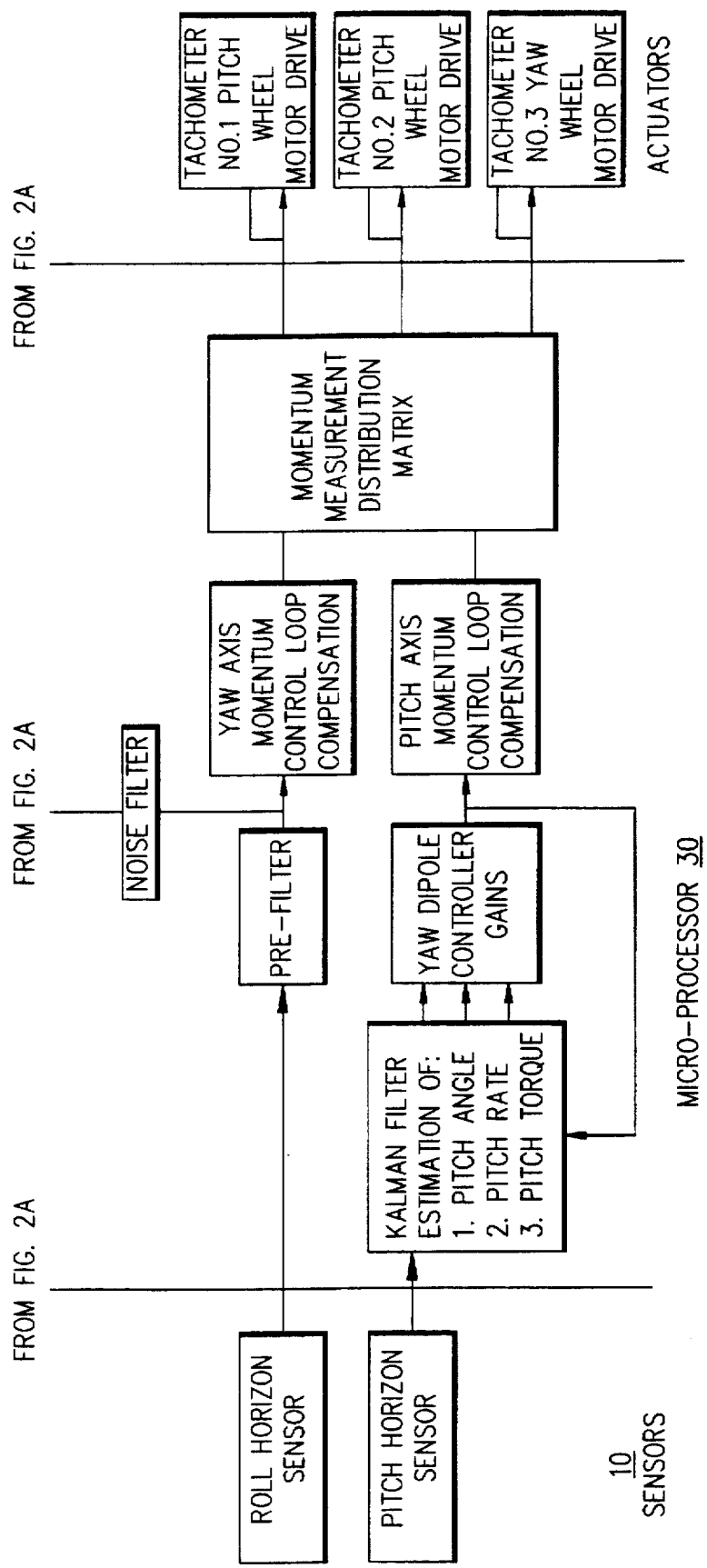

By way of setting a context for the use of the invention in an existing system, although other uses are anticipated, the exemplary HZC of the invention may be incorporated in satellites presently using Luenberger observer type systems in the manner as shown in FIG. 2. In the prior art system a sensor bank 10, including a No. 1 pitch wheel tachometer 11, a No. 2 pitch wheel tachometer 12, and No. 3 yaw wheel tachometer 13, inputs wheel speed signals to a Momentum Measurement Distribution Matrix device 14 which is part of the satellite micro-processor 30. These signals are also input to the control system for the Trim Tab positioner shown in the upper portion of the Figure. The lower portion of FIG. 2 shows the micro-processor portion which acts as the control system for processing inputs from the Roll Horizon and Pitch Horizon sensors and producing outputs to the Tachometers for the Pitch Wheel and Yaw Wheel motor drives.

Returning to device 14, upon receiving the three tachometer wheel speed measurement input signals, it outputs an appropriate first signal to a Pitch Axis Momentum Desaturation Logic device 15, and a second signal to a Yaw Axis Momentum Desaturation Logic device 16, and both a Luenberger Observer 17, and a Yaw Dipole Control Gains device 18 connected to the Observer 17. Devices 15 and 16 provide control signals to the satellite's Pitch Thruster 19 and Yaw Thruster 20. The Luenberger Observer 17 provides signals indicative of estimates of Yaw angle, Roll torque, and Yaw torque to the Gains device 18 which in the prior art, in addition to feedback signals, sends control signals to the Yaw Magnetic Coil Drive 21 and Roll Magnetic Coil Drive 22. However, in accordance with the invention, the HZC 23 has its outputs connected to the Yaw and Roll Magnetic Coil Drives, 21 and 22, with its input connected to receive the second wheel speed indicative signal from the Momentum Measurement Distribution Matrix device 14, which is a measurement of the spacecraft z-axis momentum due to the momentum wheels. Consequently, the HZC 23 is positioned to output two axis (roll and yaw) torque commands using momentum wheel speed indicative signals as input and thus controls the yaw attitude of a spacecraft by providing for torques and momentum dumping using a very simple calculation involving only the momentum wheel speed measurements. No earth sensor measurements are required.

It will accordingly be seen that the foregoing descriptions illustrate an improved system for satellite attitude control that may be incorporated in satellites presently using Luenberger observer type systems and other similar modern type systems to achieve better performance with a simpler design.

What is claimed is:

1. An attitude control system for spacecraft having momentum wheels for spacecraft momentum storage, processing means for calculating control torques, and torque actuators that can provide a torque axis anywhere in the spacecraft roll/yaw plane, comprising:

means for inputting signals indicative of the momentum wheel speeds to said processor means;

means in said processing means for calculating appropriate attitude torques, using said momentum wheel speeds indicative signals, comprising:

means, in accordance with a predetermined processing timing, for obtaining, from said momentum wheel speeds indicative signals, the spacecraft momentum wheel speed measurements and projecting said spacecraft momentum wheel speed measurements onto an axis in the spacecraft roll/yaw plane;

means for obtaining the spacecraft momentum on said roll/yaw axis;

a plurality of simple filters with different time constants which are selected according to the particular spacecraft and application;

means for inputting said roll/yaw plane axis momentum in said filters;

means for using the output of said filters to obtain two weighted linear sums, the weights of which are selected according to the particular spacecraft and application;

means for transforming each weighted linear sum into a form compatible with the spacecraft actuator command to control said torque actuators; and means, responsive to said transformed weighted linear sums, for producing output signals indicative of the calculated appropriate attitude torques in a form for controlling said torque actuators.

2. A system as in claim 1 wherein said roll/yaw plane axis is the Z-axis.

3. A system as in claim 1 wherein said filters are first order filters.

4. A system as in claim 1 wherein said torque actuators comprise an X-axis magnetic torquer coil and a Z-axis magnetic torquer coil, said means for inputting signals indicative of the momentum wheel speeds comprises momentum wheel tachometers, and wherein said roll/yaw plane axis is the Z-axis, said filters are first order filters, and said time constants and weighted linear sums are obtained through an optimization that uses an objective function constructed for the particular spacecraft and spacecraft application, said constructed objective function comprising the values:

$HZ$=spacecraft Z-axis momentum due to the momentum wheels as determined solely from the momentum wheel tachometers;

$HZ_a$=HZ first order filtered with a long term time constant;

$HZ_b$=HZ first order filtered with an intermediate term time constant; and $HZ_c$=HZ first order filtered with a short term time constant;

and wherein,

X-axis magnetic torquer coil amps, which correspond to the value produced by one of said two weighted linear sums,=$g_1 \times HZ_a + g_2 \times HZ_b + g_3 \times HZ_c$, where $g_1+g_2+g_3=1$; and Z-axis magnetic torquer coil amps, which correspond to the value produced by the other of said two weighted linear sums,=$g_4 \times HZ_a + g_5 \times HZ_b + g_6 \times HZ_c$, where $g_4+g_5+g_6=1$.

5. A system as in claim 4 wherein said long term time constant comprises multiple hours.

6. A system as in claim 4 wherein said intermediate term time constant comprises tens of minutes.

7. A system as in claim 4 wherein said short term time constant comprises minutes or fractions thereof.

8. A system as in claim 1 wherein said torque actuators comprise an East face magnetic torquer and an anti-earth face magnetic torquer and wherein said means for calculating appropriate attitude torques comprise means for executing the following code at 64 second intervals:

$HZ_a = 0.997925 \ast HZ_a + 0.002075 \ast HZ$ !513.520 minute time constant, $HZ_b = 0.962838 \ast HZ_b + 0.037162 \ast HZ$ !28.166 minute time constant, $HZ_c = 0.854345 \ast HZ_c + 0.145655 \ast HZ$ !6.776 minute time constant, $Xamp = 8.52 \ast HZ_a - 7.97 \ast HZ_b - 0.55 \ast HZ_c$ $Zamp = -2.82 \ast HZ_a - 8.48 \ast HZ_b - 11.30 \ast HZ_c$ where all of the variables are single precision, and HZ=the spacecraft body Z-axis component of the momemtum due to the momentum wheels in newton-meter- seconds, +Z points toward the Earth;

Xamp=the commanded current in amps, prior to being limited, to the East face magnetic torquer, which produces Z-axis torques;

Zamp=the commanded current in amps, prior to being limited, to the anti-earth face magnetic torquer, which produces X-axis torques; and the current is limited to a maximum of 0.4 amp for both axes.

9. A method for controlling the attitude of a spacecraft having momentum wheels for spacecraft momentum storage, processing means for calculating control torques, and torque actuators that can provide a torque axis anywhere in the spacecraft roll/yaw plane, comprising the steps of:

inputting signals indicative of the momentum wheel speeds to said processing means;

calculating appropriate torques for controlling the spacecraft attitude in said processing means using the momentum wheel speed indicative signals; and outputting signals from said processing means indicative of the calculated appropriate attitude torques in a form for controlling said torque actuators;

and wherein said step of calculating in said processing means comprises the steps, in accordance with a predetermined processing timing, of:

obtaining, from said momentum wheel speeds indicative signals, the spacecraft momentum wheel speed measurements and projecting said spacecraft momentum wheel speed measurements onto an axis in the spacecraft roll/yaw plane;

obtaining the spacecraft momentum on said spacecraft roll/yaw plane axis;

inputting said spacecraft roll/yaw plane axis momentum in several simple filters with different time constants which are selected according to the particular spacecraft and application;

using the output of said filters to obtain two weighted linear sums, the weights of which are selected according to the particular spacecraft and application;

transforming each weighted linear sum into a form compatible with the spacecraft actuator command to control said torque actuators; and sending the actuator commands to said torque actuators for carrying out said controlling operation.

10. The method of claim 9 wherein said roll/yaw plane axis is the Z-axis.

11. The method of claim 9 wherein said filters are first order filters.

12. The method of claim 9 wherein said torque actuators comprise an X-axis magnetic torquer coil and a Z-axis magnetic torquer coil, said signals indicative of the momentum wheel speeds are input by momentum wheel tachometers, and wherein said spacecraft roll/yaw plane axis is the Z-axis, said filters are first order filters, and said time constants and weighted linear sums are obtained through an optimization that uses an objective function constructed for the particular spacecraft and spacecraft application, said constructed objective function comprising the values:

$HZ$=spacecraft Z-axis momentum due to the momentum wheels as determined solely from the momentum wheel tachometers;

$HZ_a$=HZ first order filtered with a long term time constant;

$HZ_b$=HZ first order filtered with an intermediate term time constant;

$HZ_c$=HZ first order filtered with a short term time constant;

and wherein,

X-axis magnetic torquer coil amps, which correspond to the value produced by one of said two weighted linear sums,=$g_1 \times HZ_a + g_2 \times HZ_b + g_3 \times HZ_c$, where $g_1+g_2+g_3=1$; and Z-axis magnetic torquer coil amps, which correspond to the value produced by the other of said two weighted linear sums,=$g_4 \times HZ_a + g_5 \times HZ_b + g_6 \times HZ_c$, where $g_4+g_5+g_6=1$.

13. The method of claim 12 wherein said long term time constant comprises multiple hours.

14. The method of claim 12 wherein said intermediate term time constant comprises tens of minutes.

15. The method of claim 12 wherein said short term time constant comprises minutes or fractions thereof.

16. The method of claim 9 wherein said torque actuators comprise an East face magnetic torquer and an anti-earth face magnetic torquer and wherein said calculating step comprises executing the following code at 64 second intervals:

$HZ_a$=0.997925*$HZ_a$+0.002075*HZ!513.520 minute time constant, $HZ_b$=0.962838*$HZ_b$+0.037162*HZ!28.166 minute time constant, $HZ_c$=0.854345*$HZ_c$+0.145655*HZ!6.776 minute time constant, Xamp=8.52*$HZ_a$−7.97*$HZ_b$−0.55*$HZ_c$ Zamp=−2.82*$HZ_a$−8.48*$HZ_b$−11.30*$HZ_c$ where all of the variables are single precision, and HZ=the spacecraft body Z-axis component of the momentum due to the momentum wheels in newton-meter-seconds, +Z points toward the Earth;

Xamp=the commanded current in amps, prior to being limited, to the East face magnetic torquer, which produces Z-axis torques;

Zamp=the commanded current in amps, prior to being limited, to the anti-earth face magnetic torquer, which produces X-axis torques; and the current is limited to a maximum of 0.4 amp for both axes.

17. In a satellite having an attitude control system including momentum wheels for craft momentum storage, processing means for calculating control torques, and torque actuators that can provide a torque axis anywhere in the craft roll/yaw plane, the improvement including a torques control and momentum dumping system comprising:

means for measuring the momentum wheel speeds and inputting signals indicative thereof to said processing means;

means in said processing means for calculating appropriate attitude torques, using said momentum wheel speed indicative signals; and means for producing outputs indicative of the calculated appropriate attitude torques in a form for controlling said torque actuators and dumping momentum;

and wherein said means for calculating comprises:

means, in accordance with a predetermined processing timing, for processing said momentum wheel speed indicative signals and projecting the result of said processing of said momentum wheel speed indicative signals onto an axis in the spacecraft roll/yaw plane;

means for obtaining the spacecraft momentum on said roll/yaw plane axis;

a plurality of first or second order filters with different time constants which are selected according to the particular spacecraft and application;

means for inputting said roll/yaw plane axis momentum in said first or second order filters;

means for using the output of said first or second order filters to obtain two weighted linear sums, the weights of which are selected according to the particular spacecraft and application;

means for transforming each weighted linear sum into a form compatible with the spacecraft actuator command to control said torque actuators; and means for sending the actuator commands to said outputs producing means for controlling said actuators.

18. In a satellite as in claim 17 wherein said torque actuators comprise an X-axis magnetic torquer coil and a Z-axis magnetic torquer coil, said signals indicative of the momentum wheel speeds are input by momentum wheel tachometers, and wherein said time constants and weighted linear sums are obtained through an optimization that uses an objective function constructed for the particular spacecraft and application, said constructed objective function comprising the values:

$HZ_a$=HZ first order filtered with a 48 hour time constant;

$HZ_b$=HZ first order filtered with a 24 minute time constant;

$HZ_c$=HZ first order filtered with a 6 minute time constant;

X-axis magnetic torquer coil amps, which correspond to the value produced by one of said two weighted linear sums,=$g_1 \times HZ_a + g_2 \times HZ_b + g_3 \times HZ_c$, where $g_1+g_2+g_3=1$; and Z-axis magnetic torquer coil amps, which correspond to the value produced by the other of said two weighted linear sums,=$g_4 \times HZ_a + g_5 \times HZ_b + g_6 \times HZ_c$, where $g_4+g_5+g_6=1$.

19. In a satellite as in claim 17 wherein said torque actuators comprise an East face magnetic torquer and an anti-earth face magnetic torquer and wherein said means for calculating comprises means for executing the following code at 64second intervals:

$HZ_a$=0.997925*$HZ_a$+0.002075*HZ!513.520 minute time constant, $HZ_b$=0.962838*$HZ_b$+0.037162*HZ!28.166 minute time constant, $HZ_c$=0.854345*$HZ_c$+0.145655*HZ!6.776 minute time constant, Xamp=8.52*$HZ_a$−7.97*$HZ_b$−0.55*$HZ_c$ Zamp=−2.82*$HZ_a$−8.48*$HZ_b$−11.30*$HZ_c$ where all of the variables are single precision, and HZ=the spacecraft body Z-axis component of the momentum due to the momentum wheels in newton-meter-seconds, +Z points toward the Earth;

Xamp=the commanded current in amps, prior to being limited, to the East face magnetic torquer, which produces Z-axis torques;

Zamp=the commanded current in amps, prior to being limited, to the anti-earth face magnetic torquer, which produces X-axis torques; and the current is limited to a maximum of 0.4 amp for both axes.

* * * * *